United States Patent Office 3,770,639
Patented Nov. 6, 1973

3,770,639
HEXAGONAL FERRITES
Takeo Okazaki, Naotaka Sakakibara, and Takashi Okada, Tokyo, Japan, assignors to Nippon Electric Company Limited, Tokyo, Japan
Filed Jan. 21, 1971, Ser. No. 108,370
Claims priority, application Japan, Jan. 23, 1970, 45/6,647; Feb. 10, 1970, 45/12,079; Mar. 20, 1970, 45/24,313, 45/24,320; Sept. 22, 1970, 45/83,588; Oct. 23, 1970, 45/93,851
Int. Cl. H01f 1/10
U.S. Cl. 252—62.57                                3 Claims

ABSTRACT OF THE DISCLOSURE

Hexagonal ferrites are disclosed having essentially the compositions expressed by the formula

$$\mathrm{Me^{III}O \cdot (6-x-y)Fe_2O_3 \cdot xMe_2^{IV}O_3 \cdot y(Me^IO \cdot \delta Me^{II}O_2)}$$

wherein $\mathrm{Me^{III}}$ denotes at least one element selected from the group consisting of Sr, Ba, and Ca,
$\mathrm{Me^{IV}}$ denotes at least one element selected from the group consisting of Al, Cr, and Ga,
$\mathrm{M^I}$ denotes at least one element selected from the group consisting of Ni, Cu, Zn, Co, and Mg,
$\mathrm{Me^{II}}$ denotes at least one element selected from the group consisting of Ge and Ti,
$x$ and $y$ denote mol number lying within the ranges of $0 < x \leq 1.40$ and $0 < y \leq 0.6$, respectively, and $\delta$ denotes the $\mathrm{Me^IO:Me^{II}O_2}$ mol substitution ratio lying within the range of $0.6 \leq \delta \leq 1.4$.

---

The present invention relates to ferrites having hexagonal crystal structures and more particularly to new and improved hexagonal ferrites possessing most suitable magnetic properties for application for example, in resonance isolators operating in the range of millimeter wavelengths.

Hexagonal ferrites have been known to exhibit large uniaxial anisotropy fields, in themselves, and for this very feature, they have found suitable application as magnetic materials for such uses as millimeter resonance isolators. The characteristics of resonance isolators are generally assessed in terms of the bandwidth for isolation ($L_B$) and the insertion loss ($L_F$). For instance, the electrical characteristics required for isolators to be incorporated in repeaters operating at millimeter wave frequencies are as follows: Bandwidth for 20 db isolation be in excess of 1.0 gHz. in the operating temperature range of minus 5° C. through plus 55° C. and the insertion loss be as small as possible. Therefore, occurrence of resonance at any desired frequency in the millimeter wave region, small changes in the resonance frequency with ambient temperature, optimum sintering densities, high degrees of orientation of crystal particles, and low tan $\delta$ have been considered to be among the most desirable qualifications of hexagonal ferrites intended for such applications.

As magnetic materials which cause resonance at a frequency in excess of 50 gHz. by utilizing the uniaxial anisotropic field alone, are known hexagonal ferrites in which the magnetoplumbite type crystal constituents are $\mathrm{Fe_2O_3}$ and at least one oxide selected from the group consisting of divalent metallic oxides SrO, BaO, CaO, and PbO and in which part of Fe is replaced by at least one element of the trivalent metals Al, Cr, and Ga. For example, known hexagonal ferrites of the compositions expressed by the chemical formula $$\mathrm{SrO \cdot (6-x)Fe_2O_3 \cdot xAl_2O_3}$$

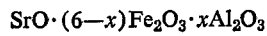

have a resonance frequency ($fr$) in the range of 55 through 110 gHz., where $0 \leq x \leq 1.35$. Hexagonal ferrites of these compositions, however, possess drawbacks such that the temperature variations of the resonance frequency ($fr$) from $-5°$ C. to $55°$ C. is positive and the variation becomes the greater the higher the value of $fr$. For these reasons, either the resonance frequency range or the operating temperature range of known hexagonal ferrites for application in millimeter resonance isolators has been restricted.

OBJECTS OF THE INVENTION

It is, therefore, an object of the present invention to provide new and improved hexagonal ferrites having a sufficiently high resonance frequency whose temperature variation is very small.

Another object of this invention is to provide new and improved hexagonal ferrites of the kind eminently suitable for application in millimeter resonance isolators for repeaters, in circulators or in high-power isolators, in which a resonance frequency can be made sufficiently high in the millimeter range when the bandwidth is restricted to a predetermined value and in which an operating temperature range can be taken sufficiently wide when the resonance frequency is set at a predetermined value.

THE INVENTION

The present invention is featured by substituting at least one of $\mathrm{Al_2O_3}$, $\mathrm{Cr_2O_3}$, and $\mathrm{Ga_2O_3}$ for a part of $\mathrm{Fe_2O_3}$ and at the same time $\mathrm{Me^IO \cdot Me^{II}O_2}$ ($\mathrm{Me^I}$ denotes at least one element selected from the group consisting of Ni, Cu, Zn, Co, and Mg and $\mathrm{Me^{II}}$ denotes at least one element of Ge and Ti; $\mathrm{Me^IO}$ and $\mathrm{Me^{II}O_2}$ substitution ratio may or may not be mol equivalent as will be mentioned) for another part of $\mathrm{Fe_2O_3}$ in the magnetoplumbite type hexagonal ferrites whose principal constituents are $\mathrm{Fe_2O_3}$ and at least one oxide of the group consisting of SrO, BaO and CaO. These simultaneous substitutions make it possible to obtain hexagonal ferrites having a high resonance frequency ($fr$) in excess of 50 gHz. and at the same time excellent temperature stability of the resonance frequency ($fr$).

The features and advantages of this invention will be best appreciated from the following descriptions and tables in connection with the accompanying drawings.

The processes of manufacturing the hexagonal ferrites of the following embodiments as well as the method of measurement of their excellent properties will be briefly outlined at first.

The hexagonal ferrites were prepared in accordance with known procedures, that is, the procedures of Procurement of starting Materials-Weighing-Mixing-Drying-Prefiring-Wet Milling-Pressing in the presence of a magnetic field-Sintering. Experiments using many samples have proven that the improvement of temperature variation of $fr$ remained substantially unaffected insofar as the following conditions for preparation were observed:

(1) Starting materials comprise metallic elements necessary for the constituency of the final hexagonal ferrites and are those compounds which easily decompose into oxides at a temperature in excess of 1,000° C. Examples thereof are $SrCO_3$, $FeOOH$, $Al_2O_3$, $GeO_2$, $NiO$ and $NiCO_3$.

(2) Prefiring is performed at a temperature between 1,200° and 1,400° C. for a period of at least 30 minutes.

(3) Milling is performed in a steel ball mill for a period of from 20 to 80 hours.

(4) Sintering is carried out in an oxidizing atmosphere for 1–4 hours at a sintering temperature between 1,150° and 1,350° C. The rate of increase in temperature up to the sintering temperature is 200 to 250° C. per hour and cooling rate from the sintering temperature down to room temperature is 50°∼200° C. per hour.

The sintered ferrite products thus prepared were suitably cut and polished into desired shapes. Using these samples, resonance isolators were fabricated and meaurement of the resonance frequencies at −5° C, 25° C, and 55° C. were conducted and the temperature variation of the resonance frequency from −5° C. to 55° C. was computed.

Now, the effect of $Me^IO \cdot Me^{II}O_2$ substitution according to this invention will be detailed, by use of specific examples.

Figure 1:
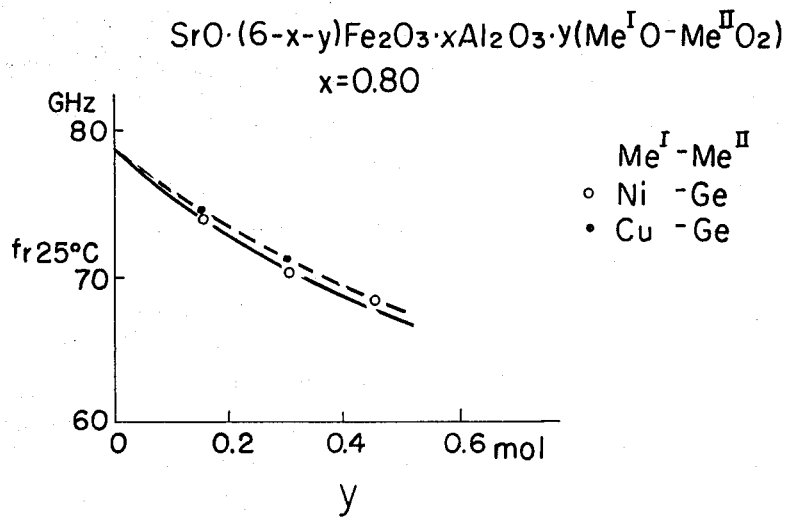
FIGS. 1 through 5 are graphs illustrating a comparison between conventional hexagonal ferrites and those improved by this invention as regards the resonance frequency at 25° C. ($fr$ 25° C.) and the temperature variation of the resonance frequency from $-5°$ C. to 55° C.
Figure 2:
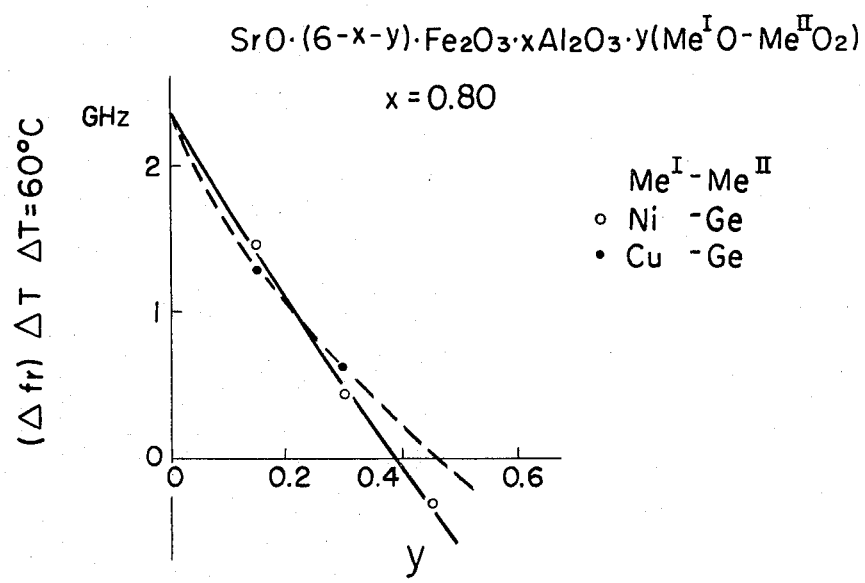

FIG. 1 shows the relation between the resonance frequency $fr$ at 25° C. and the amount "$y$" of $Me^IO \cdot Me^{II}O_2$ substitution, plotted for samples having the compositions expressed by the formula $$SrO \cdot (6-x-y)Fe_2O_3 \cdot xAl_2O_3 \cdot y(Me^IO \cdot Me^{II}O_2)$$

where $Me^I$ is Ni or Cu and $Me^{II}$ is Ge and $x=0.80$ and $0 \leq y \leq 0.45$. Referring to the curves of FIG. 1, it will be seen that $fr$ 25° C. decreases with increasing $y$. FIG. 2 shows the amount of change in $fr$ due to temperature variation from −5° C. to 55° C. as a function of $y$ in the same samples. The notation $(\Delta fr)\Delta T$, which is equal to $fr(55°C.)-fr(-5° C.)$, is used hereinafter to indicate the temperature variation of $fr$. As is evident from these curves, the value $(\Delta fr)\Delta T$ decreases with increasing $y$ and it becomes nil or negative depending on $y$. As for the solid curve, where the combination of Ni—Ge is used for $Me^I \cdot Me^{II}$, this occurs for $y \geq 0.38$ and as for the dashed curve where Cu—Ge combination is used, this occurs for $y \geq 0.46$.

Figure 3:
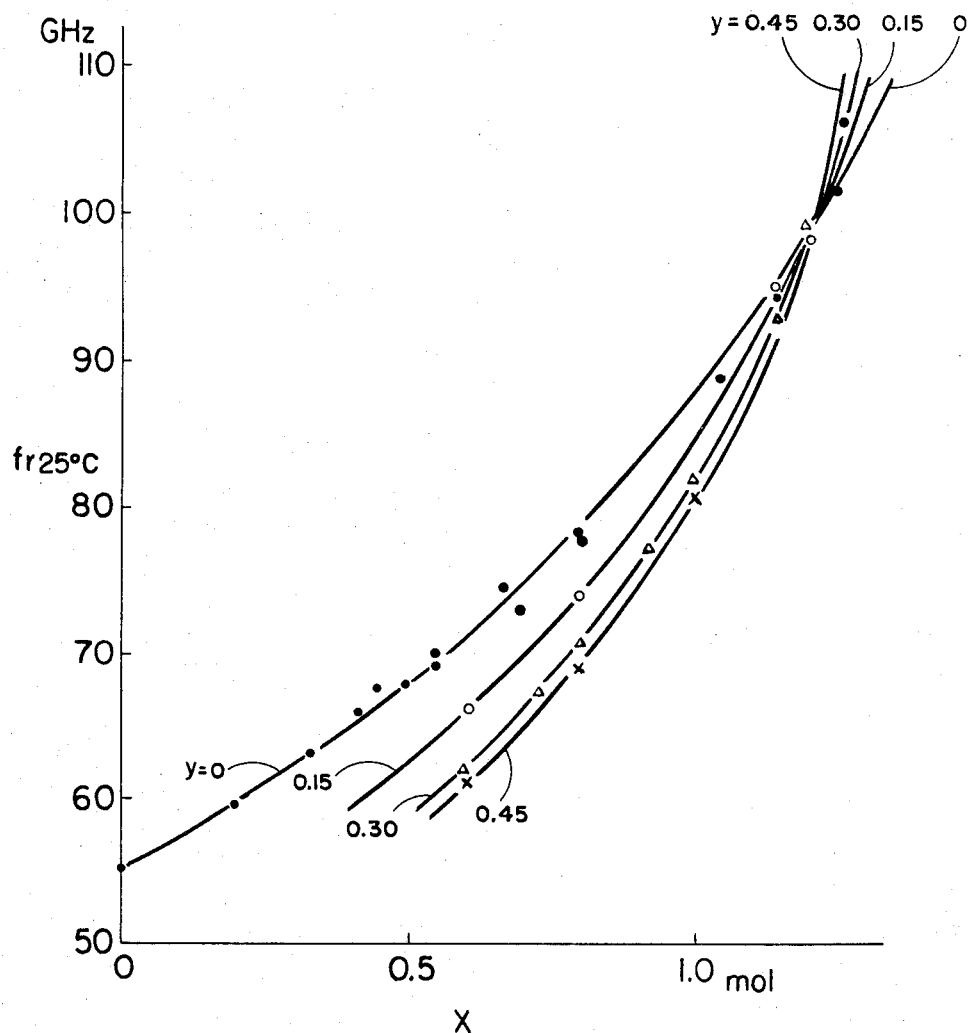
Figure 4:
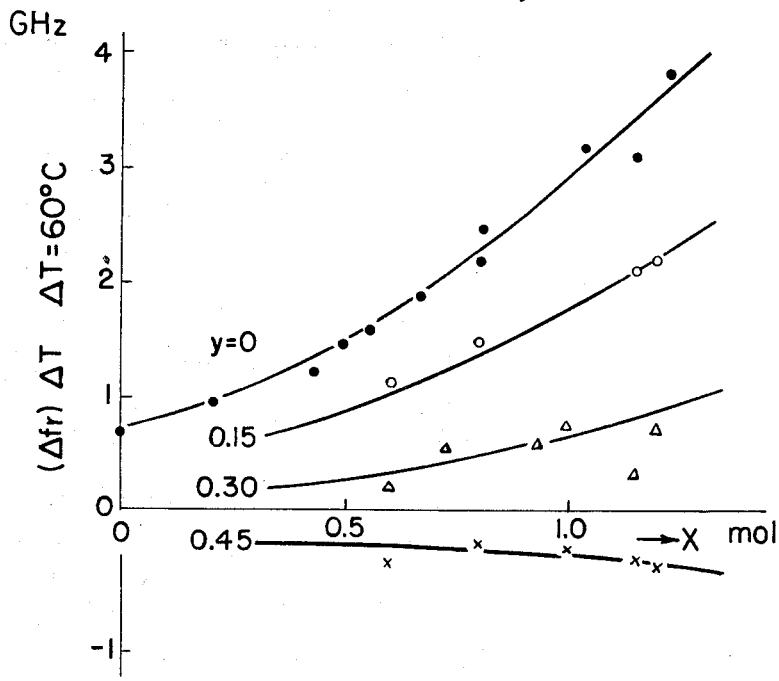
Figure 5:
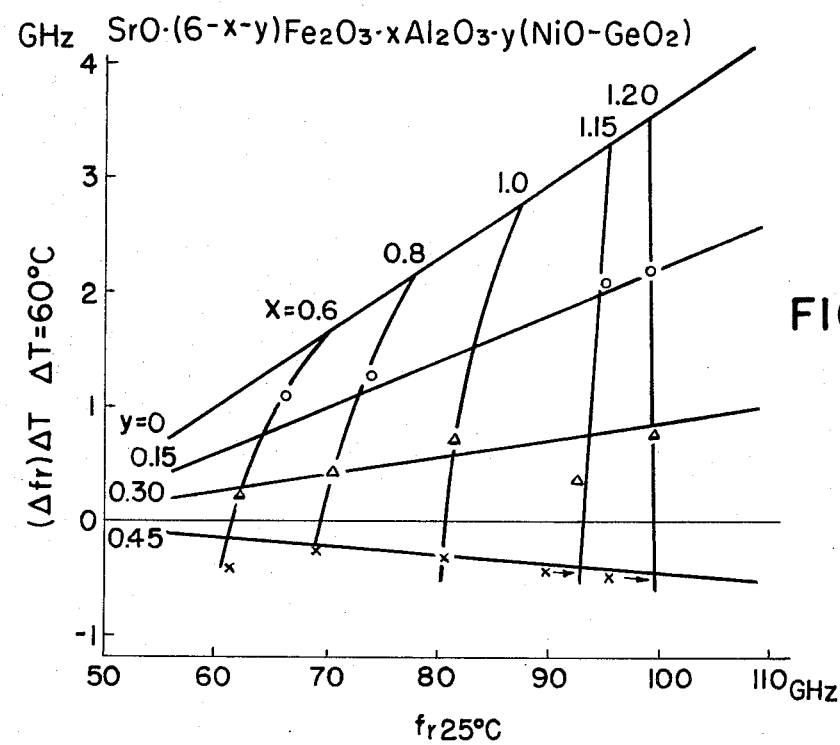

These effects on $fr$ and the value of $(\Delta fr)\Delta T$ depend not merely upon the $Me^IO$—$Me^{II}O_2$ substitution, but also upon the $Al_2O_3$ substitution, as will be evident from FIGS. 3 and 5. FIG. 3 shows curves illustrating $fr$ at 25° C. as a function of the amount "$x$" (varying from 0 to 1.25) of $Al_2O_3$ substitution with $y$ taken as a parameter (varying as 0, 0.15, 0.30, and 0.45) in samples having the same compositions as mentioned above, wherein $Me^I$ and $Me^{II}$ stand for Ni and Ge, respectively. FIG. 4 illustrates the value of $(\Delta fr)\Delta T$ as a function of $x$ with $y$ taken as a parameter (varying as 0, 0.15, 0.30, and 0.45) in the same samples.

An inspection of a family of curves of FIG. 3 reveals that $fr$ increases with increase in $x$ while $fr$ drops at the same point of $x$ as $y$ increases from 0 and that the $fr$ drop at the same point of $x$ between any two curves decreases with increasing $x$ until the cross-point is reached, at which point of $x$ $fr$ does not vary irrespective of $y$ and from which point the tendency of $fr$ drop begins to be reversed. Likewise, an inspection of FIG. 4 readily reveals that $(\Delta fr)\Delta T$ increases with increase in $x$, the $(\Delta F)\Delta T$ drop at the same point of x interposed between any two curves increases with increasing $x$, and $(\Delta fr)\Delta T$ may be constant irrespective of $x$ if $y$ is suitably selected.

The effect of simultaneous $Al_2O_3$ and $Me^IO$—$Me^{II}O_2$ substitutions of this invention with respect to $fr$ and $(\Delta fr)\Delta T$ have been outlined above. Now let it be required to proceed to the description of the merits of the new hexagonal ferrites in the light of application in millimeter resonance isolators.

FIG. 5 shows the value of $(\Delta fr)\Delta T$ as a function of $fr$ with $x$ and $y$ taken as two parameters varying in the ranges $0 \leq x \leq 1.25$ and $0 \leq y \leq 0.45$ for the Al and NiO—GeO$_2$ substituted hexagonal ferrites. With conventional hexagonal ferrites for $y=0$, that is, having the formula $$SrO \cdot (6-x)Fe_2O_3 \cdot xAl_2O_3$$

the value of $(\Delta fr)\Delta T$ is positive and the value becomes larger, the higher the resonance frequency $fr$, as will be seen from the curve for $y=0$ in FIG. 5. In other words, it was impossible heretofore to prepare hexagonal ferrites having a desired value of $fr$ in the millimeter range and at the same time, the value of $(\Delta fr)\Delta T$ is zero. A further inspection of FIG. 5 will indicate that such hexagonal ferrites that have a small or zero value of $(\Delta fr)\Delta T$ with any required value of $fr$ can be prepared by suitably controlling the values of $x$ and $y$.

Figure 6:
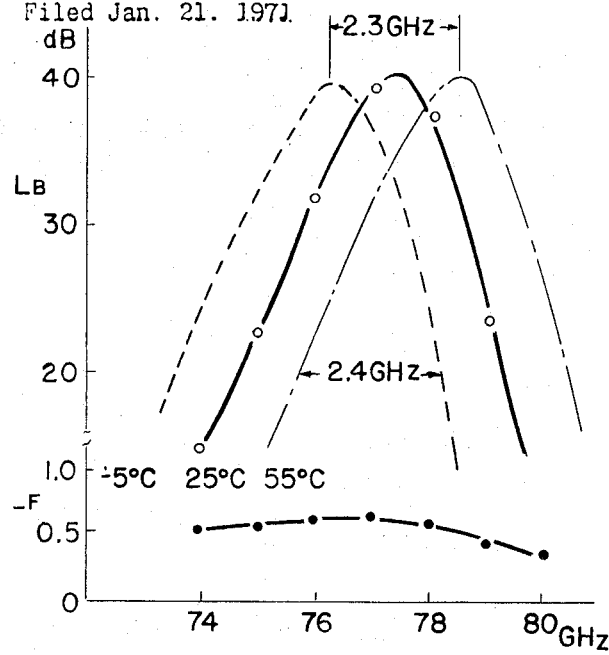
FIGS. 6 through 9 are graphs illustrating the manner in which the electrical characteristics of resonance isolators are improved by use of novel hexagonal ferrite materials of this invention.
Figure 7:
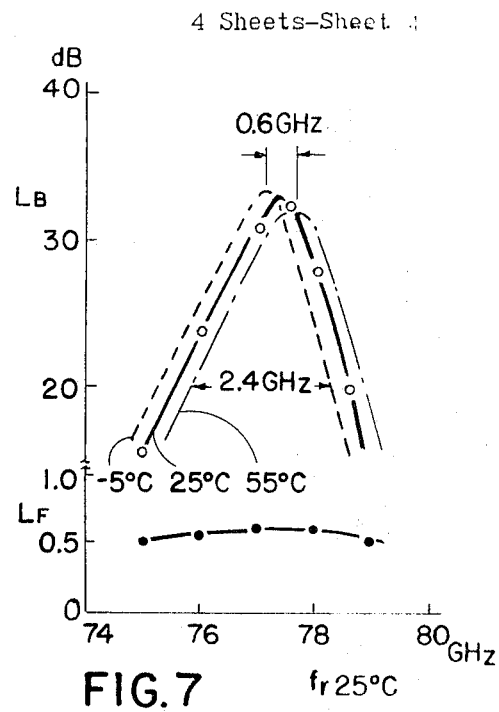

FIGS. 6 and 7 indicate a comparison of the electrical characteristics of two resonators, one incorporating a conventional hexagonal ferrite and the other a hexagonal ferrite of this invention. The compositions of the former and latter ferrites are respectively $x=0.8$, $y=0$ and $x=0.93$, $y=0.3$ in the formula $$SrO \cdot (6-x-y)Fe_2O_3 \cdot xAl_2O_3 \cdot y(NiO \cdot GeO_2)$$

Figure 8:
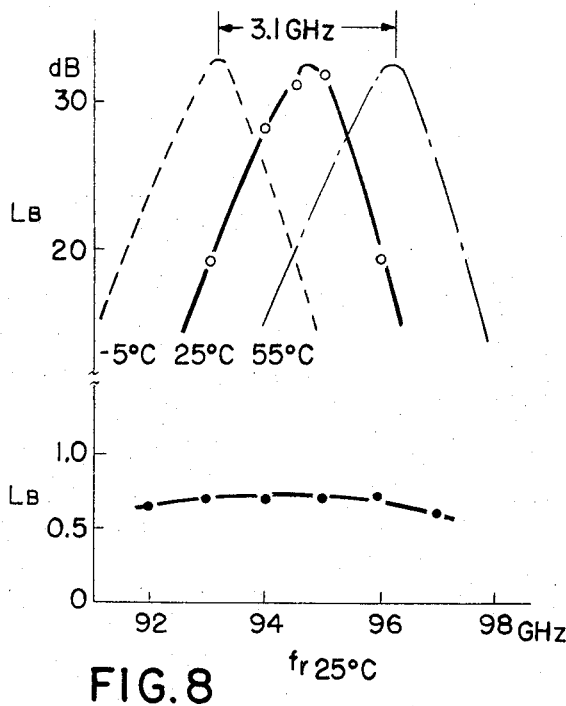
Figure 9:
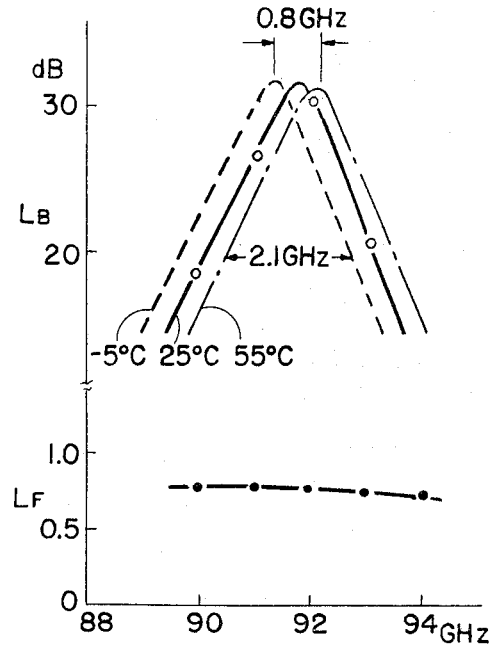

The characteristics shown in FIG. 6—that is, $fr$ 25° C. of about 77 gHz. in the rated operating temperature range −5° C. through 55° C., bandwidth of 2.4 gHz. for isolation ($L_B$) of 20 db, and insertion loss ($L_F$) of 0.6 db, are of the same order as those of the isolator shown in FIG. 7. In contrast, a comparison of FIGS. 8 and 9 indicates that the characteristics of an isolator containing the ferrite of this invention have been greatly improved over the other using a conventional ferrite material—that is, the allowable bandwidth for $L_B=20$ db for the temperature range −5° C. through 55° C. has been improved from 0 in FIG. 8 to 2.1 gHz. in FIG. 9. The compositions of the conventional ferrite of FIG. 8 and the new hexagonal ferrite of FIG. 9 are respectively $x=1.13$, $y=0$ and $x=1.13$, $y=0.3$ in the formula $$SrO \cdot (6-x-y)Fe_2O_3 \cdot xAl_2O_3 \cdot y(NiO-GeO_2)$$

According to measurements using many samples, superiority of the new hexagonal ferrites for millimeter resonance isolated applications to the conventional can be demonstrated, and the most favorable hexagonal ferrites for application in millimeter resonance isolators should have the compositions of $0.75 < x < 1.20$ and $0 < y < 0.45$ in the formula $$SrO \cdot (6-x-y)Fe_2O_3 \cdot xAl_2O_3 \cdot y(NiO-GeO_2).$$

Among other applications of hexagonal ferrities having $fr$ in the millimeter range and small $(\Delta fr)\Delta T$ values are high-power isolators, circulators, etc. The preferred compositions most suitable for such applications are $0 < x < 1.2$ and $0.3 < y < 0.45$ in the same chemical formula as mentioned above, as could easily be seen from the graphs of FIG. 5.

A description has been made above of magnetic properties of Ni(or Cu) and Ge substituted hexagonal ferrites having the formula $$SrO \cdot (6-x-y)Fe_2O_3 \cdot xAl_2O_3 \cdot y(Me^IO \cdot Me^{II}O_2)$$

as well as electrical characteristics of isolators using such ferrites. However, new hexagonal ferrite materials contemplated by this invention are, of course, not restricted to these embodiments.

Extensive experimentation conducted by the inventors has demonstrated that equally favorable magnetic properites as regards $fr$ and $(\Delta fr)\Delta T$ can be realized for compositions $0 < x \leq 1.4$ and $0 < y \leq 0.6$ in the same formula as referenced previously, even in cases where at least one of the group consisting of Ni, Cu, Zn, Co, and Mg is substituted for $Me^I$ (in cases where $Me^I$ contains Co, the amount of CoO must be restricted to 0.3 mol or less) and at the same time, at least one of Ti and Ge is substituted for $Me^{II}$ and further, the $Me^IO:Me^{II}O_2$ substitution ratio ($\delta$) is varied within the range $0.6 \leq \delta \leq 1.4$. Typical examples of such compositions and the values of their $fr$ and $(\Delta fr)\Delta T$ are shown in Table 1. It has also been verified by experiments that new hexagonal ferrites having desirable magnetic properties as above mentioned within the ranges $0<x<1.4$  $0<y\leq0.6$ and with a wide variety of $Me^IO$—$Me^{II}O_2$ substitutions mentioned above can be prepared even if SrO is replaced by at least one of the group consisting of SrO, BaO, and CaO, and $Al_2O_3$ is replaced by at least one member of the group consisting of $Al_2O_3$, $Cr_2O_3$ and $Ga_2O_3$. Typical compositions for this case together with the values of $fr$ and $(\Delta fr)\Delta T$ are set forth in Table 1.

$Me^{II}$ denotes at least one element selected from the group consisting of Ge and Ti, $x$ and $y$ denote mol numbers lying within the ranges of $0<x\leq1.40$ and $0.15\leq y\leq0.6$, respectively, and $\delta$ denotes the $Me^IO:Me^{II}O_2$ mol substitution ratio lying within the range of $0.6\leq\delta\leq1.4$.

2. Hexagonal ferrites consisting of the compositions expressed by the formula $$SrO\cdot(6-x-y)Fe_2O_3\cdot xAl_2O_3\cdot y(NiO\cdot GeO_2),$$

wherein $x$ is $0.75<x<1.20$ and $y$ is $0<y<0.45$.

TABLE 1

| Sample No. | Composition | $fr$ °C. | $(\Delta fr)\cdot\Delta T$ |
|---|---|---|---|
| 1 | $SrO\cdot4.90Fe_2O_3\cdot0.80Al_2O_3\cdot0.30(NiO\cdot TiO_2)$ | 63 | 0.4 |
| 2 | $SrO\cdot4.40Fe_2O_3\cdot1.00Al_2O_3\cdot0.60(NiO\cdot TiO_2)$ | 55 | −1.5 |
| 3 | $SrO\cdot4.85Fe_2O_3\cdot0.85Al_2O_3\cdot0.30(CuO\cdot TiO_2)$ | 62 | 0.8 |
| 4 | $SrO\cdot5.00Fe_2O_3\cdot0.85Al_2O_3\cdot0.15(CuO\cdot GeO_2)$ | 75 | 1.3 |
| 5 | $SrO\cdot4.85Fe_2O_3\cdot0.85Al_2O_3\cdot0.30(CuO\cdot GeO_2)$ | 71 | 0.6 |
| 6 | $SrO\cdot4.70Fe_2O_3\cdot1.00Al_2O_3\cdot0.30(ZnO\cdot TiO_2)$ | 65 | 0.7 |
| 7 | $SrO\cdot4.45Fe_2O_3\cdot1.00Al_2O_3\cdot0.55(ZnO\cdot TiO_2)$ | 50 | −0.9 |
| 8 | $SrO\cdot4.70Fe_2O_3\cdot1.00Al_2O_3\cdot0.30(ZnO\cdot GeO_2)$ | 73 | 1.3 |
| 9 | $SrO\cdot4.45Fe_2O_3\cdot1.00Al_2O_3\cdot0.55(ZnO\cdot GeO_2)$ | 63 | 0.5 |
| 10 | $SrO\cdot4.70Fe_2O_3\cdot1.00Al_2O_3\cdot0.30(CoO\cdot TiO_2)$ | 67 | 1.4 |
| 11 | $SrO\cdot4.70Fe_2O_3\cdot1.00Al_2O_3\cdot0.30(CoO\cdot GeO_2)$ | 79 | 1.0 |
| 12 | $SrO\cdot5.15Fe_2O_3\cdot0.55Al_2O_3\cdot0.30(MgO\cdot TiO_2)$ | 55 | 0.4 |
| 13 | $SrO\cdot4.90Fe_2O_3\cdot0.80Al_2O_3\cdot0.30(MgO\cdot GeO_2)$ | 68 | 0.8 |
| 14 | $SrO\cdot4.33Fe_2O_3\cdot1.17Al_2O_3\cdot0.2NiO\cdot0.3CuO\cdot0.5GeO_2$ | 90 | −0.9 |
| 15 | $SrO\cdot5.00Fe_2O_3\cdot0.7Al_2O_3\cdot0.12NiO\cdot0.06CuO\cdot0.3GeO_2$ | 66 | 0.5 |
| 16 | $SrO\cdot4.45Fe_2O_3\cdot1.25Al_2O_3\cdot0.2NiO\cdot0.05CuO\cdot0.05ZnO\cdot0.3GeO_2$ | 97 | 0.6 |
| 17 | $SrO\cdot5.00Fe_2O_3\cdot0.70Al_2O_3\cdot0.18NiO\cdot0.30GeO_2$ | 66 | 0.5 |
| 18 | $SrO\cdot5.00Fe_2O_3\cdot0.70Al_2O_3\cdot0.42NiO\cdot0.30GeO_2$ | 67 | 0.4 |
| 19 | $BaO\cdot5.55Fe_2O_3\cdot0.3Al_2O_3\cdot0.15(NiO\cdot TiO_2)$ | 50 | 0.1 |
| 20 | $0.6SrO\cdot0.4CaO\cdot5.00Fe_2O_3\cdot0.70Al_2O_3\cdot030(NiO\cdot GeO_2)$ | 68 | 0.7 |
| 21 | $SrO\cdot5.10Fe_2O_3\cdot1.00Cr_2O_3\cdot0.30(NiO\cdot GeO_2)$ | 62 | −0.5 |
| 22 | $SrO\cdot4.85Fe_2O_3\cdot1.00Ga_2O_3\cdot0.15(NiO\cdot GeO_2)$ | 60 | 0.5 |

While there have been described what are considered to be the typical embodiments of this invention, it will be obvious to those skilled in the art that the scope of this invention will cover all hexagonal ferrite compositions as set forth in the following claims.

What is claimed is:

1. Hexagonal ferrites consisting of the compositions expressed by the formula $$Me^{III}O\cdot(6-x-y)Fe_2O_3\cdot xMe_2^{IV}O_3\cdot y(\delta Me^IO\cdot Me^{II}O_2)$$

wherein $Me^{III}$ denotes at least one element selected from the group consisting of Sr, Ba, and Ca, $Me^{IV}$ denotes at least one element selected from the group consisting of Al, Cr, and Ga, $Me^I$ denotes at least one element selected from the group consisting of Ni, Cu, Zn, Co, and Mg, the amount of CoO when Co is present not exceeding 0.3 mol, 3. Hexagonal ferrites consisting of the compositions expressed by the formula $$SrO\cdot(6-x-y)Fe_2O_3\cdot xAl_2O_3\cdot y(NiO\cdot GeO_2),$$

wherein $x$ is $0<x<1.2$ and $y$ is $0.3<y<0.45$.

References Cited

UNITED STATES PATENTS

| 3,573,207 | 3/1971 | Deschamps | 252—62.58 |
| 3,113,109 | 12/1963 | Brixner | 252—62.63 X |
| 3,155,623 | 11/1964 | Erickson | 252—62.63 X |
| 2,960,471 | 11/1960 | Gorter | 252—62.63 X |
| 3,291,739 | 12/1966 | Deschamps | 252—62.58 X |
| 3,457,174 | 7/1969 | Deschamps et al. | 252—62.58 X |

EDWARD J. MEROS, Primary Examiner

JACK COOPER, Assistant Examiner

U.S. Cl. X.R.

252—62.58, 62.59, 62.6, 62.62, 62.63, 62.64